April 6, 1965 P. A. BEZZERIDES 3,176,783
WEEDER

Original Filed May 2, 1960 2 Sheets-Sheet 1

PAUL A. BEZZERIDES
INVENTOR
HUEBNER & WORREL
ATTORNEYS
BY

United States Patent Office 3,176,783
Patented Apr. 6, 1965

3,176,783
WEEDER
Paul A. Bezzerides, P.O. Box 1303, Orosi, Calif.
Continuation of abandoned application Ser. No. 25,920,
May 2, 1960. This application Dec. 14, 1962, Ser. No.
245,363
22 Claims. (Cl. 172—686)

The present invention relates to an agricultural implement and more particularly to a flexible earthworking tool for destroying weeds and other undesired growth, and for otherwise working the ground, especially in proximity to cultivated plants, while flexibly sliding past such plants. This application is a continuation of my co-pending application Serial No. 25,920 filed May 2, 1960 entitled Weeder, now abandoned.

One of the chief purposes of plant cultivation is to destroy weeds which compete with crop plants for soil nutrients and water, stifle plant growth, impede irrigation, interfere with harvest and processing of the harvested produce, and which blight the appearance of a field of crops. If unchecked, weeds can, of course, grow in any part of a field of row crops, that is, in the furrows between the rows, and on the ridges or beds in close proximity to growing plants both between the rows and between adjacent plants in each row.

Many conventional earthworking tools are available for uprooting, cutting, or otherwise destroying weeds. Usually, such tools intended for row crops include rigid earth engaging blades or teeth mounted for movement through the soil between the rows of plants. Several of these conventional tools are effective for destroying weeds, and otherwise cultivating the soil, in the furrows and on the sides of the adjacent ridges between the rows of plants.

However, in most instances the most deleterious weeds are those which grow closely adjacent to the plants. If undisturbed, prolific weeds frequently grow so fast that they conceal and even stifle or choke young crop plants to which they are adjacent. Past efforts to destroy weeds close to the plants have not been generally satisfactory because of their ineffectiveness or cost. The use of rigid weeding blades mounted so as to move through the soil closely adjacent to the plants have often contacted the crop plants, uprooting, scraping, or otherwise damaging the same. Such rigid blades are frequently successful in destroying weeds in laterally spaced relation to rows of crop plants. However, even this function is not always properly performed because movement of such implements over furrowed or uneven terrain causes lateral sway sufficient to move weeding blades into contact with the row plants if the blade is initially positioned in closely, laterally adjacent relation to the row of plants. Even in instances in which there is little or no sway, a rigid blade cannot reach between the plants in a row to destroy weeds without destroying the plants too. Therefore it has heretofore been considered necessary to weed by hand the areas closely adjacent to the crop plants and between the plants in the rows. However, such operations are time consuming and expensive, in some instances so expensive as to render the production of certain row crops uneconomic.

Accordingly, it is an object of the present invention to provide an earthworking blade for destroying weeds and other undesired growth, and for otherwise cultivating the ground in close proximity to plants with a minimum of damage to the plants.

Another object is to provide a weeding blade which is effective in weed eradication and which can be brought into contact with crop plants with a minimum or no damage thereto.

Another object is to provide an earthworking blade adapted flexibly to slide past plants with which it comes in contact.

Another object is to destroy weeds between the plants in a row thereof by an implement mounted for earth traversing movement longitudinally of the row.

Another object is to promote healthy plant growth, enable effective irrigation, facilitate harvest, and to improve field appearance through improved cultivation and weed control.

Other objects are to provide an earthworking blade which is simple and economical to manufacture and use, durable in construction, dependable in operation, adaptable for cultivating various kinds of crops and at various stages of growth, and which is highly effective for accomplishing its intended purposes.

These, together with other objects, will become more fully apparent upon reference to the following description and accompanying drawings.

Figure 1:
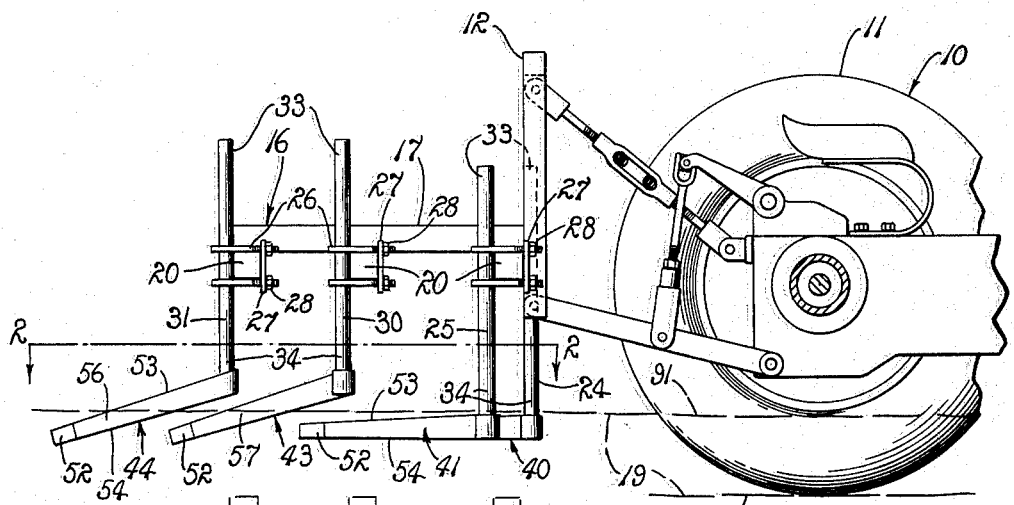
FIG. 1 is a side elevation of an agricultural implement including earthworking blades embodying the principles of the present invention connected to a tractor, which is shown fragmentarily in longitudinal section, and with an implement in a earthworking position.

Referring more particularly to the drawings, a tractor is generally indicated by the numeral 10 and includes ground wheels, as 11, and a power lift mechanism generally identified by the numeral 12. An agricultural implement 16, embodying the principles of the present invention, includes a frame 17 supported in a substantially horizontal position in elevationally spaced relation to the ground 19 by the lift mechanism. It is to be understood that the tractor, the lift mechanism and the connections thereto which are shown are for purposes of illustration and do not limit the invention in this respect. The frame includes elongated front, intermediate, and rear tool bars 20 extended transversely of the forward line of travel of the tractor and in transversely spaced relation to each other.

Front, inner and outer, elongated shanks 24 and 25, respectively, are mounted on the front tool bar 20 in longitudinally spaced relation to each other therealong by U-bolts 26 fitted around the shanks above and below the tool bar. Plates 27 are slidably fitted over the forwardly extended ends of the bolts, and nuts 28 are screw-threaded on the bolts against the plates. In this manner the shanks are adjustable longitudinally along the tool bar and thus taransversely of the line of travel of the implement 16. Also, the shanks are mounted for elevational adjustable movement with respect to the tool bar and for rotatable adjustment within the U-bolts when the nuts are loosened. Similarly, rear, outer, and inner shanks 30 and 31 are adjustably mounted on the intermediate and rear tool bars, respectively, by U-bolts 26, plates 27, and associated nuts 28. It is thus evident that each shank is supported on its tool bar in a substantially erect plane in longitudinal alignment with the line of travel of the implement and that each shank has an upper end portion 33 and a downwardly extended lower end portion 34. It is also to be observed in FIG. 2 that the front and rear innner shanks 24 and 31 are in a common vertical plane in longitudinal alignment with said line of travel.

Figure 2:
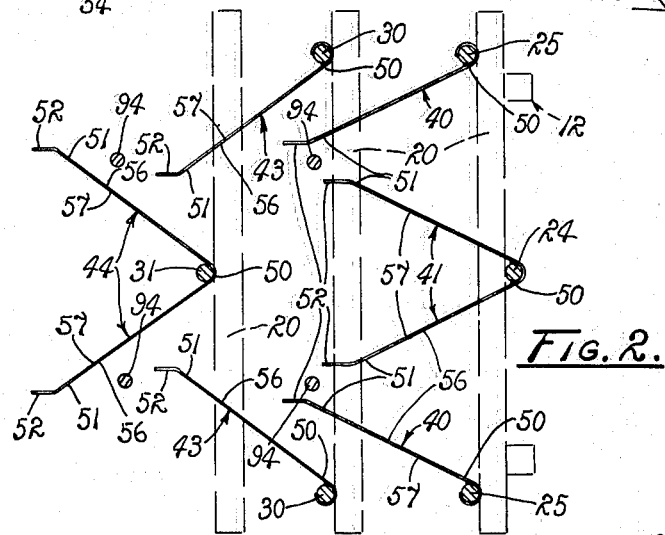
FIG. 2 is a horizontal section taken on line 2—2 of FIG. 1 with the positions of the superimposed tool bars for mounting the subject blades shown in dashed lines.
Figure 4:
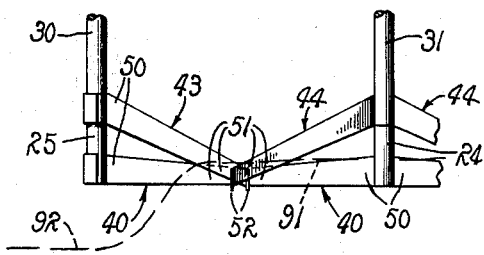
FIG. 4 is a fragmentary rear elevation of the implement showing the relationship between front and rear pairs of earthworking blades.

Elongated, substantially flat, longitudinally resiliently flexible, front, outer and innner earth engaging blades 40 and 41 are respectively mounted on th lower end portions 34 of the front shanks 24 and 25. Rear outer and inner blades 43 and 44, shaped similarly to the front blades, are respectively mounted on the lower end portions of the rear shanks 30 and 31. As best illustrated in FIGS. 1, 2 and 4, the front blades 40 and 41 extend horizontally outwardly from their shanks in substantially perpendicular relation thereto while the rear blades 43 and 44 are slightly downwardly declined from their shanks.

Each blade 40, 41, 43 and 44 has forward and rearward end portions 50 and 51, an angulated rear tip 52, upper and lower longitudinally extended edges 53 and 54, and front and rear surfaces 56 and 57. The forward portions of the outer blades are wrapped around their respective shanks and connected thereto, as by welding. The front and rear, inner blades are divergently extended from the shanks to which they are respectively connected. In the illustrated embodiment, the forward end portions of corresponding front and rear inner blades are integrally interconnected and extended about their respective shanks to which they are also connected, as by welding.

Figure 3:
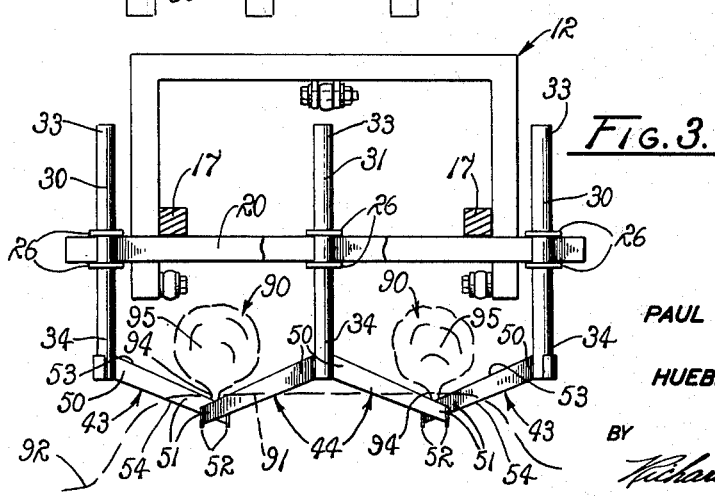
FIG. 3 is a rear elevation of the implement of FIG. 1 with portions thereof broken away and with other portions omitted for illustrative convenience.
Figure 7:
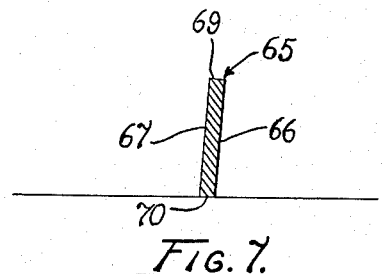
FIG. 7 is a somewhat enlarged transverse section taken on line 7—7 of FIG. 6.

The shanks 24, 25, 30 and 31 are adjusted in their bolts 26 so that the blades 40, 41, 43 and 44 extend rearwardly, laterally, from the respective shanks, with their front and rear surfaces 56 and 57 facing respectively forwardly and rearwardly relatively to the direction of movement of the implement 16. The upper edges 53 of the blades are preferably located slightly in advance of the lower edges 54 thereof. Stated otherwise, each blade is preferably tipped slightly forwardly so that its front surface is in slightly acute angular relation to a horizontal plane, as shown in FIG. 7. The blades are thus mounted in opposed front pairs 40, 41 and rear pairs 43 and 44 on opposite sides of the front and rear inner shanks 24 and 31. It is to be noted that the adjacent blades of each pair of blades are rearwardly convergently extended with their rearward end portions 51 in longitudinally spaced, overlapping, staggered relation witih respect to the line of travel of the tractor 10 and the implement 16. Considering front and rear pairs of blades 40 and 43, the rearward end portions of the forward pair of blades are preferably laterally spaced farther apart than the rearward end portions of the rear pair of blades. In cultivating certain crops, the rearward end portions of the rear blades transversely overlap the rearward end portions of blades forwardly thereof, as viewed in the direction of travel and as illustrated in FIGS. 2 and 3. Even if the rearward end portions of the blades are not overlapped, however, the transverse distance between adjacent tips 52 is normally relatively narrow. Further, the shanks are rotatably adjustable in their respective U-bolts 26 to permit adjustment of the angle of attack between the outer blades 40 and 43 and the line of travel of the implement. If it is desired to change the angle of attack of the inner blades 41 and 44, a different set of blades and mounting shank are employed.

Of primary significance to the subject invention is the fact that each blade 40, 41, 43 and 44 is resiliently, longitudinally flexible substantially about the longitudinal axis of its respective shank 24, 25, 30 and 31 incident to application of pressure directed rearwardly against the front surface 56 of the rearward end portion 51 of each blade. The degree of flexibility of the blades is varied by proper selection of blade dimensions and material. Preferably the rear blades are more flexible than the front blades for reasons soon to become apparent. How flexible the blades should be is a function of several variables including the type of plants and stage of plant growth, the type of weeds to be destroyed, the composition of the soil to be cultivated, and whether the blade is a front or a rear blade. Assuming that it is desired to destroy such weeds as watergrass and tumbleweeds from a field of cabbage after about four weeks of growth of the cabbage plants from seeds planted about one inch deep, and subsequent to thinning the blades used are preferably constructed of tempered, high carbon, spring steel with each blade 40 and 41 in the front pair of blades having a thickness of approximately 0.090 inches, that is about fourteen gauge metal, and with their rearward end portions 51 spaced about three or four inches apart. The blades 43 and 44 in the rear pair of blades are about 0.060 inch thick or sixteen gauge metal, and have their rearward end portions overlapped. It is evident that when the plants are young and tender, and/or when the soil is relatively loosely composed, blades of greater flexibility are employed than when the plants are more advanced in size and durability and/or the soil is more tightly compacted. This designation of dimensions and materials is set forth merely to illustrate one commercially successful embodiment under one set of circumstances. Obviously the invention is not limited to either the material or dimensions disclosed.

Second Form

Figure 6:
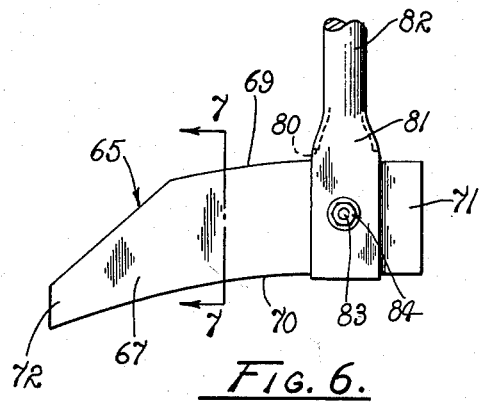
FIG. 6 is a side elevation of a second form of earthworking blade embodying the principles of the present invention.

The subject invention provides a second form of blade, generally indicated by the numeral 65, in FIG. 6, especially useful for cultivating very young and tender plants. This blade is preferably made of a highly resiliently flexible, somewhat soft, material, such as rubber or plastic. The blade is elongated, has front and rear surfaces 66 and 67, upper and lower edges 69 and 70 and forward and rearward end portions 71 and 72, as before. The forward end portion 71 of the blade 65 is fitted in a notch 80 at the lower end portion 81 of an elongated shank 82 and is held therein by bolt 83 and nut 84. The shank is adapted to be mounted on any of the tool bars 20 of the implement 16 all as previously described in connection with the first form of the invention. Likewise, the blade is mounted and angled in a manner similar to the blades 40, 41, 43, and 44 depending on its use as a front or rear blade.

More specifically, it has been found that the blade 65 can conveniently be made from a sheet of four-ply rubber, similar to that employed in the outer carcass of an automobile tire, having a thickness of about one-half of an inch, a maximum dimension between said upper and lower edges 69 and 70 of about three inches, and a length of about seven inches. Once again, it is to be understood that the invention is not limited to these dimensions or material and that other degrees of flexibility are obtained when other dimensions and materials are used.

Operation

The operation of the described embodiments of the subject invention is believed to be readily apparent and is briefly summarized at this point.

It is to be assumed that the subject implement 16 is adapted to cultivate a field of cabbage, as illustrated in FIG. 3, wherein two transversely spaced, longitudinal rows of plants 90 are located in a ridge 91, and wherein furrows 92 separate adjacent ridges. Each plant has an upwardly extended stalk 94 and a head 95. Normally, the rows in each ridge are about thirteen inches apart. Weeding with the subject implement is usually first performed after the cabbage has been thinned and fertilized and when the plants have had about four weeks of growth from seeds; such plants may be about four inches tall and usually have a stalk diameter of about one-eighth to one-fourth of an inch. At the same time, weeds may have advanced to a height of one inch and more. Of course, as the plants continue to grow thereafter, the subject implement can be used as required.

The implement 16 in in a cultivating position when the wheels 11 of the tractor 10 straddle the ridge 91 and are individually located in furrows, as 92, in the field. With the adjustment of the blades 40, 41, 43 and 44 as illustrated and described above, the front and rear pairs of blades are then on opposite sides of the rows of plants 90 in the ridge and extend inwardly toward the stalks 94 and under the heads 95. The rearward end portions 51 of all of the blades are in earth penetrating engagement. The depth of earth penetration may be as little as one-half inch below the surface of the ground. The rearward end portions of the front blades are spaced laterally outwardly from the stalks 94 while the overflapped rearward end portions of the rear blades extend transversely of their respective rows. As illustrated in FIG. 4, more front surface area of the front blades engages in a greater width of soil farther out from the stalks than the rear blades. Conversely stated, less front surface area of the rear blades engages the soil but this smaller contact area is concentrated in close proximity to the stalks, that is at the sides of the stalks and between adjacent stalks in a row.

Figure 5:
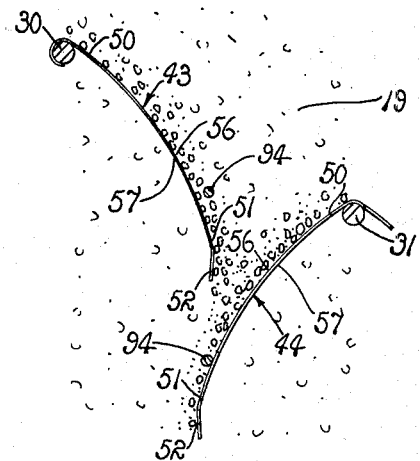
FIG. 5 is a diagrammatic plan view of a pair of opposed, rearwardly overlapped, cultivating blades of the present invention shown in earthworking positions on opposite sides of a row of plants.

As the implement 16 is drawn over the ground by the tractor 10, the blades 40, 41, 43 and 44 pass through the soil and uproot or sever weeds, and otherwise disturb the ground, in their respective paths. As illustrated in FIG. 5, when the blades are moved forwardly through the soil, they are flexed rearwardly by the rearwardly directed reactive forces exerted against the front surfaces 56 of the rearward earth penetrating end portions of the blades. Because the rear blades are preferably inherently more flexible than the front blades, and penetrate earth essentially only at their rearward extremities, the front blades do not flex as much as the rear blades. This is desirable because the front pairs of blades initially work the soil and destroy weeds laterally outwardly from the plants 90 and at least partially disturb the soil in advance of the rear blades. Thus the front blades make it easier for the rear pairs of blades to work laterally closer to and longitudinally between the plants where it is particularly desired to destroy weeds and otherwise to cultivate the soil.

With reference to FIG. 5, it is noted that the rear blades 43 and 44 extend between adjacent plant stalks 94 in a row thereof as the blades move longitudinally of the row. As evident in FIG. 2, even the front blades 40 and 41, which are not overlapped, thrust encountered earth laterally inwardly toward the row and thus disturb and cover the soil between adjacent plants in the row to some extent. As the rearward end portion 51 of each rear blade advances toward a stalk 94 of a plant, the soil between the stalk and the blade is compressed or compacted. When the soil is initially loosely compacted and/or the blades are working at a relatively shallow depth, the blades may actually contact the stalks and slide thereover incident to rearward flexing of the blades. If the blades operate at greater depth and/or if the soil is more closely compated, sufficient dirt may collect between the stalks and blades and prevent actual contact of the blades with the stalks. Again, however, the blades simply flex rearwardly and slide past the compressed dirt and plants. Between adjacent plants, there is not as much resistance to forward movement of the blades and, therefore, the blades are allowed resiliently to return toward straightened position whereby they extend laterally outwardly between the plants or at least disturb the soil and uproot weeds therein. It is to be noted that while conventional rigid or inflexible blades would also work the soil between adjacent plants, if such rigid blades were extended laterally outwardly far enough to reach between such adjacent plants, they would also contact the plants during forward movement and, being unable to flex rearwardly, they would uproot, destroy, or at least damage to some extent the plants contacted.

It is to be noted that the subject invention takes advantage of the fact that the stalks 94 and root systems of the plants, as 90, are sturdier than those of the weeds normally encountered and thus can withstand the pressure of the blades 40, 41, 43 and 44 thereagainst while the weeds cannot. Of course, only the more flexible rearward end portions 51 of the blades normally engage the plants. However, if the implement 16 sways laterally as it moves over the ground, and the front blades, for example, engage the plants, these blades also flex rearwardly and slide over the plants without uprooting, or otherwise damaging, the same.

In summary, therefore, it is to be noted that the blades 40, 41, 43, 44 of the subject implement are always flexible but that variations in the degree of flexibility and other blade adjustments can be made depending primarily on the nature of the plants. A tabulation of some of the variables together with the direction in which these variables are changed with different types of plants is set forth below.

| Blade Characteristic | Plants or Root Systems or Stalks Thereof Young or Tender | Advanced or Sturdy Plants |
|---|---|---|
| Flexibility | More | Less. |
| Length | Less | More. |
| Working depth | Greater | Less. |
| Angle of attack | Less | Greater. |
| Lateral spacing between the rearward end portions. | Farther apart | Closer. |

While the above operation has referred to the cultivation of cabbage 90, it is to be noted that the subject implement is equally as useful for cultivating onions, cotton, corn, tomatoes and various other row crops planted in multiple or single rows to the ridge. For tomatoes, as an example, it is best to penetrate the soil with the blades 40, 41, 43, 44 deeper than with cabbage, not to overlap the rear blades 43 and 44, and to make the angle of attack of the blades less severe, that is, to reduce the angle between the blades and the line of travel of the implement. Thus, even if the blades do contact the roots of the tomato plants, they easily slide therepast without damage to the plants.

From the foregoing, it will be evident that an earthworking tool has been provided for destroying weeds and other undesirable growth in close proximity to plants without uprooting or damaging the plants. The implement cultivates the soil between adjacent plants in a row and laterally outwardly adjacent to each plant. The subject tool is adaptable to various plants and stages of growth thereof by varying the flexibility, length, working depth, angularity, spacing and other characteristics, in certain defined respects. It has been found during actual use of the subject implement that plants can be mehcanically cultivated in a much more rapid manner without regard to lateral swaying of the implement inasmuch as the subject tool is adapted for harmless plant engagement and flexible slidable movement therepast.

Although the invention has been herein shown and described in what is conceived to be the most practical and preferred method, embodiment, and ingredients, it is recognized that departures may be made therefrom within the scope of the invention, which is not to be limited to the details disclosed herein but is to be accorded the full scope of the claims so as to embrace any and all equivalent methods, ingredients and apparatus.

Having described my invention, what I claim as new and desire to secure by Letters Patent is:

1. In an earthworking implement for cultivating on opposite sides of a row of crops and in close proximity to the crops, a frame; means mounting the frame in elevated position for earth traversing movement in a predetermined forward direction along a line of travel extended longitudinally of the row of crops; a pair of elongated, substantially flat, longitudinally resiliently flexible, earth penetrating blades having forward and rearward end portions, and front and rear surfaces; and means individually mounting the forward end portions of the blades on the frame with the blades rearwardly extended in convergent relation to each other, with their front surfaces facing in said forward direction of travel and in opposed relation to each other, and with the rearward end portions in juxtaposition to a common upright plane aligned with said direction of travel whereby during movement of the blades through the soil on opposite sides of a row of crops, the blades flex rearwardly incident to engagement with the crops and slide therepast without damaging or appreciably displacing the crops, the rearward end portions of the blades being transversely overlapped and in longitudinally spaced relation to each other with respect to said line of travel.

2. In an earthworking implement for cultivating on opposite sides of a row of crops and in close proximity to the crops, a frame; means mounting the frame in elevated position for earth traversing movement in a predetermined forward direction along a line of travel extended longitudinally of the row of crops; a pair of elongated, substantially flat, longitudinally resiliently flexible, earth penetrating blades having forward and rearward end portions, and front and rear surfaces; and means individually mounting the forward end portions of the blades on the frame with the blades rearwardly extended in convergent relation to each other, with their front surfaces facing in said forward direction of travel and in opposed relation to each other, and with the rearward end portions in juxtaposition to a common upright plane aligned with said direction of travel whereby during movement of the blades through the soil on oposite sides of a row of crops, the blades flex rearwardly incident to engagement with the crops and slide therepast without damaging or appreciably displacing the crops, the blades being rearwardly declined from their forward end portions to their rearward end portions.

3. In an earthworking implement for cultivating on opposite sides of a row of crops and in close proximity to the crops, a frame; means mounting the frame in elevated position for earth traversing movement in a predetermined forward direction along a line of travel extended longitudinally of the row of crops; front and rear pairs of elongated, substantially flat, longitudinally resiliently flexible, earth penetrating blades having forward and rearward end portions, and front and rear surfaces; and means individually mounting the forward end portions of both the front and rear pairs of blades on the frame in longitudinally spaced relation thereon with the blades of each pair of blades rearwardly extended in convergent relation to each other, with their front surfaces facing in said forward direction of travel and in opposed relation to each other, and with the rearward end portions in juxtaposition to a common upright plane aligned with said direction of travel whereby during movement of the blades through the soil on opposite sides of row crops, the blades flex rearwardly incident to engagement with the crops and slide therepast without damaging the crops, the rearward end portions of the front pair of blades being spaced farther apart than the rearward end portions of the rear pair of blades.

4. The implement of claim 3 wherein the blades of said front pair of blades are substantially horizontal while the blades of said rear pair are downwardly declined toward said rearward end portions, wherein the forward end portions of the rear blades are above the front blades and the rearward end portions of the rear blades are below the front blades, wherein the rear blades are of greater longitudinal flexibility than the front blades, and wherein the rearward end portions of the rear blades are transversely overlapped.

5. The implement of claim 3 wherein the rear blades are of greater longitudinal flexibility than the front blades.

6. The implement of claim 3 wherein the rearward end portions of the rear blades extend downwardly below the rearward end portions of the front blades.

7. The implement of claim 3 wherein the rearward end portions of the rear blades extend inwardly of the rearward end portions of their corresponding front blades.

8. In an earthworking implement for cultivating a row of crops and in close proximity to the crops, a frame; means mounting the frame in elevated position for earth traversing movement in a predetermined forward direction along a line of travel extended longitudinally of the row of crops; front and rear substantially flat, longitudinally resiliently flexible earth penetrating blades having forward and rearward end portions, and front and rear surfaces; and means individually mounting the forward end portions of the front and rear blades on the frame in longitudinally spaced relation thereon with the blades rearwardly extended in oblique angular relation to said line of travel, with their front surfaces facing in said forward direction of travel, and with the rearward end portions in juxtaposition to a common upright plane aligned with said direction of travel whereby during movement of the blades through the soil laterally adjacent to said row of crops, the blades flex rearwardly incident to engagement with the crops and slide therepast without damaging the crops, the rear blade being of greater longitudinal flexibility than the front blade.

9. In an earthworking implement for cultivating a row of crops and in close proximity to the crops, a frame; means mounting the frame in elevated position for earth traversing movement in a predetermined forward direction along a line of travel extended longitudinally of the row of crops; front and rear substantially flat, longitudinally resiliently flexible earth penetrating blades having forward and rearward end portions, and front and rear surfaces; and means individually mounting the forward end portions of the front and rear blades on the frame in longitudinally spaced relation thereon with the blades rearwardly extended in oblique angular relation to said line of travel, with their front surfaces facing in said forward direction of travel, and with the rearward end portions in juxtaposition to a common upright plane aligned with said direction of travel whereby during movement of the blades through the soil laterally adjacent to said row of crops, the blades flex rearwardly incident to engagement with the crops and slide therepast without damaging the crops, the rearward end portion of the rear blade being extended inwardly of said common upright plane relative to the rearward end portion of the front blade.

10. In an earthworking implement for cultivating a row of crops and in close proximity to the crops, a frame; means mounting the frame in elevated position for earth traversing movement in a predetermined forward direction along a line of travel extended longitudinally of the row of crops; front and rear substantially flat, longitudinally resiliently flexible earth penetrating blades having forward and rearward end portions, and front and rear surfaces; and means individually mounting the forward end portions of the front and rear blades on the frame in longitudinally spaced relation thereon with the blades rearwardly extended in oblique angular relation to said line of travel, with their front surfaces facing in said forward direction of travel, and with the rearward end portions in juxtaposition to a common upright plane aligned with said direction of travel whereby during movement of the blades through the soil laterally adjacent to said row of crops, the blades flex rearwardly incident to engagement with the crops and slide therepast without damaging the crops, the rearward end portion of the rear blade being downwardly extended below the rearward end portion of the front blade.

11. In an earthworking implement for cultivating along a side of a row of crops and in close proximity to the crops, a frame; means mounting the frame in elevated position for earth traversing movement along a line of travel extended longitudinally of the row of crops; front and rear elongated, resiliently flexible earth engaging blades having forward and rearward end portions and front and rear surfaces; and means mounted in the frame spaced in the direction of earth traversing movement of the frame individually mounting the forward end portions of the front and rear blades with the rearward end portion of each blade extended obliquely rearwardly and laterally from its mounting means, the front blade being more acutely angularly related to the direction of movement than the rear blade, the front faces of the blades being disposed in substantially erect planes and facing in the direction of earth traversing movement, and the blades being adapted to flex rearwardly incident to engagement with the crops and to slide therepast with a minimum of damage thereto.

12. In an earthworking implement for cultivating on opposite sides of a row of crops and in close proximity to the crops, a frame; means mounting the frame in elevated position for earth traversing movement in a predetermined forward direction along a line of travel extended longituidnally of the row of crops; a pair of elongated, transversely substantially flat blades having predetermined forward and rearward ends and front and rear surfaces; and means individually connected to the forward ends of the blades mounting the blades of the frame with the blades in transversely substantially erect position and longitudinally rearwardly extended in convergent relation to each other with their front surfaces facing obliquely in said forward direction of travel and in opposed relation to each other on opposite sides of said row, and with their rearward ends adjacent to a common upright plane of reference aligned with said direction of travel and intermediate the forward ends of the blades, said blades each being substantially rigid in its transverse dimension, being longitudinally substantially rigid in vertical reference, and being longitudinally resiliently flexible in horizontal reference whereby during movement of the blades through the soil on opposite sides of the row the blades flex rearwardly incident to engagement with the crops and slide therepast with a minimum of damage and displacement thereof.

13. The implement of claim 12 in which the blades have upper and lower longitudinally extended edges, the lower edge of each blade being disposed for earth engagement and the upper edge of each blade being slightly in advance of its lower edge.

14. The implement of claim 12 in which each blade has a relaxed condition to which it tends to return when free of all flexing forces with its rearward end spaced inwardly from its forward end a predetermined distance, and in which the mounting means mounts the forward ends of the blades a distance apart less than the total of said inward spacing of the rearward ends of the blades from their respective forward ends when in relaxed condition.

15. In an earthworking implement for cultivating row crops in close proximity to the crops, a frame; means mounting the frame for earth traversing movement longitudinally of a row of such crops in substantially constant predetermined relative position transversely of the row; an elongated transversely substantially flat blade having opposite ends; and means in the frame in predetermined laterally spaced relation to the row of crops connected to the blade and mounting the blade in the frame in transversely substantially erect position rearwardly extended along the ground in oblique angular relation to said row of crops and rearwardly convergent therewith, said blade being substantially rigid in its transverse dimension, being longitudinally substantially rigid in vertical reference, being longitudinally resiliently flexible in horizontal reference, and having a transversely substantially flat front face portion forwardly and laterally presented toward said row, the blade having a relaxed condition to which it tends to return when free of all flexing forces with its rearward end spaced transversely of the implement from its forward end a distance greater than said spacing of the mounting means from the row of crops.

16. In an earthworking implement for cultivating row crops in close proximity to the crops, a frame; means mounting the frame for earth traversing movement longitudinlly of a row of such crops; an elongated transversely substantially flat blade having opposite ends; and means mounting the blade in the frame in transversely approximately erect position rearwardly extended along the ground in oblique angular relation to said row of crops and rearwardly convergent therewith, said blade being substantially rigid in its transverse dimension, being longitudinally substantially rigid in vertical reference, being longtudinally resiliently flexible in horizontal reference, and having upper and lower longitudinally extended edges, the lower edge of the blade being disposed for earth engagement and the upper edge thereof being slightly in advance of its lower edge so as to provide a front surface being transversely of the blade in somewhat acute angular relation to the horizontal.

17. In an earthworking implement for cultivating on opposite sides of a row of crops and in close proximity to the crops, a frame; means mounting the frame for earth traversing movement in a predetermined forward direction along a line of travel extending longitudinally of the row of crops; a pair of elongated, transversely substantially flat blades having predetermined forward and rearward ends and front and rear surfaces; and means connected to the blades at positions forwardly spaced from the rearward ends thereof mounting the blades on the frame with the blades in transversely approximately erect positions and longitudinally rearwardly extended in convergent relation to each other, with their front surfaces facing obliquely in said forward direction of travel and in opposed relation to each other on opposite sides of said row, and with their rearward ends adjacent to a common upright plane of reference aligned with said direction of travel and intermediate the forward ends of the blades, said blades being longitudinally resiliently flexible in horizontal reference whereby during movement of the blades through the soil on opposite sides of the row the blades flex rearwardly incident to engagement with the crops and slide therepast with a minimum of damage and displacement thereof.

18. The implement of claim 17 in which the blades have upper and lower longitudinally extended edges, the lower edge of each blade being disposed for earth engagement and the upper edge of each blade being slightly in advance of its lower edge so that its front surface transversely of the blade is in somewhat acute angular relation to the horizontal.

19. The implement of claim 17 in which each blade has a relaxed condition to which it tends to return when free of all flexing forces with its rearward end spaced inwardly from its forward end a predetermined distance, and in which the mounting means mounts the forward ends of the blades a distance apart less than the total of said inward spacing of the rearward ends of the blades from their respective forward ends when in relaxed condition.

20. The implement of claim 17 in which the rearward ends of the blades are transversely overlapped and are in spaced relation to each other longitudinally of said line of travel.

21. In an earthworking implement for cultivating along a side of a row of crops and in close proximity to the crops, a frame; means mounting the frame for earth traversing movement along a line of travel extending longitudinally of the row of crops; front and rear elongated, longitudinally horizontally resiliently flexible earth engaging blades having forward and rearward end portions and front and rear surfaces; and means mounted in the frame spaced in the direction of earth traversing movement of the frame connected to the blades at positions in forwardly spaced relation from their rearward end portions mounting the front and rear blades in the frame with the rearward end portion of each blade extended obliquely rearwardly and laterally from its mounting means, the front blade being more acutely angularly related to the direction of movement than the rear blade, the front faces of the blades being transversely substantially erect and facing in the direction of earth traversing movement, and the blades being adapted to flex rearwardly incident to engagement with obstructions and to slide therepast during earth traversing movement.

22. In an earthworking implement for cultivating along a side of a row of crops and in close proximity to the crops, a frame; means mounting the frame for earth traversing movement along a line of travel extended longitudinally of the row of crops; front and rear elongated, longitudinally horizontally resiliently flexible earth engaging blades having forward and rearward end portions and front and rear surfaces; and means mounted in the frame spaced in the direction of earth traversing movement of the frame connected to the blades at positions in forwardly spaced relation from their rearward end portions mounting the front and rear blades in the frame with the rearward end portion of each blade extended obliquely rearwardly and laterally from its mounting means, the rear blade being of greater longitudinal horizontal resilient flexibility than the front blade, the front faces of the blades being transversely substantially erect and facing in the direction of earth traversing movement, and the blades being adapted to flex rearwardly incident to engagement with obstructions and to slide therepast during earth traversing movement.

References Cited by the Examiner

UNITED STATES PATENTS 464,346    12/91    Whipple _____ 172—142

OTHER REFERENCES

"What's New" (H&M Rubber Cultivating Tool . . .), published in "Implement & Tractor," Jan. 24, 1959 (page 36).

SAMUEL KOREN, *Primary Examiner.*

ABRAHAM G. STONE, *Examiner.*